United States Patent [19]

Marui et al.

[11] Patent Number: 4,998,291
[45] Date of Patent: Mar. 5, 1991

[54] RADIO TELEPHONE APPARATUS

[75] Inventors: Kuniyoshi Marui; Kazuhiro Kawashima, both of Tokyo, Japan

[73] Assignee: Kabushiki Kaisha Toshiba, Kanagawa, Japan

[21] Appl. No.: 275,312

[22] Filed: Nov. 23, 1988

[30] Foreign Application Priority Data

Nov. 30, 1987 [JP] Japan .................... 62-302508

[51] Int. Cl.⁵ .............................................. H04B 1/38
[52] U.S. Cl. ............................................ 455/89; 379/58
[58] Field of Search ............... 455/89, 90, 343, 154, 455/159, 38; 381/51; 379/58

[56] References Cited

U.S. PATENT DOCUMENTS

| 4,475,010 | 10/1984 | Huensch et al. |
|---|---|---|
| 4,639,550 | 1/1987 | Yamagawa et al. |
| 4,682,368 | 7/1987 | Takahashi ............................ 455/38 |
| 4,742,560 | 5/1988 | Arai ..................................... 455/38 |
| 4,761,806 | 8/1988 | Toki . |
| 4,796,291 | 1/1989 | Makino ................................ 455/38 |
| 4,802,201 | 1/1989 | Yoshizawa et al. |

Primary Examiner—Reinhard J. Eisenzopf
Assistant Examiner—Kinfe-Michael Negash
Attorney, Agent, or Firm—Banner, Birch, McKie & Beckett

[57] ABSTRACT

A radio telephone apparatus comprises detecting means for detecting a predetermined signal sequence other than a signal sequence associated with address signaling or an incoming call indicator signal and means for indicating that a call is received in response to the detection of the predetermined signal sequence. A user of the apparatus may prestore identification numbers of parties from whom the user wishes to receive calls. Also, by means of a transmitted password and a comparison of the password upon receipt with a prestored password, incoming calls will be received.

30 Claims, 15 Drawing Sheets

RADIO TELEPHONE APPARATUS

FIELD OF THE INVENTION

The present invention relates to the field of radio telephone apparatus such as mobile telephones, transportable radio phones, or portable radio phones and more specifically to radio telephones in which calls from other parties are selectively received.

BACKGROUND OF THE INVENTION

Recently various kinds of radio telephones have been developed. One of these is generally referred to as a mobile telephone. The mobile radio telephone, which may be mounted in a car, a train, a ship or the like, comprises a transceiver unit with an antenna and telephone unit including a handset and a base unit. These units are physically separated and are connected by signal lines to one other. Another kind of radio telephone is referred to as a portable telephone. Portable telephones may be further divided into two groups: a transportable type and a handheld type. In the transportable type of portable radio telephone, a transceiver unit is combined into a main unit of a telephone unit and an antenna is attached to the main unit, consequently a user may carry the transportable telephone wherever the user goes. In the handheld type of portable radio telephone, all components are compacted into one unit which may be held in the hand of a user. All of these radio telephones are supplied with power from a battery.

Generally, it is required to reduce consumption of electric power since its power is supplied from a battery installed therein or in a vehicle, which has a limited power capacity.

Although the power of the battery is consumed whenever the radio telephone is turned on, additional power is consumed whenever a ringer tone must be generated in response to reception of a call from another party. Because power is needed to drive a loud speaker for generating the ringer tone, it is desirable to reduce either the number of times or the ringing period when calls from other parties are received. Especially, in the case of a portable phone, which has only a limited power capacity owing to miniturization therefor, the consumption of battery power is a serious problem. For example, when only limited power capacity is remaining and a call from a third party, which may not even be an important call, is received, the power of battery may be immediately consumed due to the necessary generation of ringer tone. Consequently, a user becomes unable thereafter to subsequently make or receive a call. Even in the case of a mobile telephone in a car, whenever the car is parked and the mobile telephone is left turned on without being attended by another party, if calls from anyone are received, the power of the battery is wastefully consumed.

Although the user may think to turn off the power supply in these cases, it will be impossible for the user to receive an important call or an emergency call.

Yet, in some situations the user may intentionally wish to prevent reception of incoming calls. For example, the user may wish to turn off power to the telephone while the user is attending a meeting or the like thereby preventing reception of incoming calls. Also in such a case, it is desirable for the user to be capable of receiving an important call or an emergency call.

In prior art telephone apparatus, repertory dialing is well known. For repertory dialing, the user may store a personalized repertory dialing list including a plurality of frequently called numbers is stored in a memory of the apparatus. A user may make a call to one of the frequently called numbers by inputting an abbreviated data code corresponding to a called number. When a user receives calls from other apparatus, the repertory dialing list may be thought to be useful in distinguishing an important incoming call or an emergency call from the other calls because the contents of the two lists may be similar. However, it is necessary for call restriction to identify the unique identification number of calling apparatus. Prior art radio telephone apparatus equipment with repertory dialing features is not configured to identify, nor do known radio telephone systems provide to a called apparatus, a telephone number for each calling apparatus.

SUMMARY OF THE INVENTION

It is accordingly an object of the present invention to provide a radio telephone apparatus capable of receiving calls selectively.

It is a further object of the present invention to provide a radio telephone apparatus for alarming a user in response to the reception of a predetermined sequence of signals after receiving an address signal for the apparatus.

It is a still further object of the present invention to provide a radio telephone apparatus for alarming a user in response to the reception of one or more voice messages after receiving an address signal of the apparatus.

To achieve one or more of the objects, as embodied and described herein, the invention comprises receiving means for receiving signals broadcast through one or more radio channels from a base station; first detecting means responsive to said receiving means for detecting a first predetermined signal sequence indicative of an incoming call to the radio telephone apparatus; second detecting means for detecting a second predetermined signal sequence originated in a calling apparatus and transmitted in association with said first predetermined signal sequence; indicating means, responsive to the detection of both of said first predetermined signal sequence and said second predetermined signal sequence, for indicating reception of a call.

The problems and related problems of prior art radio telephone apparatus are solved by the principals of the present invention. In this invention, a password signal sequence is received in association with an incoming call to a radio telephone. The password signal sequence is detected at the radio telephone by comparing the password signal sequence with password data prestored in the radio telephone. Upon a detection of reception of the password signal sequence, the radio telephone indicates reception of the call. The password signal sequence may be dual tone multi frequency (DTMF) signals or human spoken voice signals. These signals are detected by a DTMF receiver or a voice recognizer. Furthermore, the radio telephone may indicate reception of a call by displaying the password so that a user of the radio telephone apparatus can identify who is calling. Also the radio telephone apparatus in accordance with the present invention may be realized without changing the entire configuration of a radio telephone system since the password signal sequence may be transmitted over a speech communication link established between a calling apparatus and a called apparatus.

Another advantage of the present invention is that the display and user input apparatus may be separate from the radio telephone apparatus and integrated into the dashboard or other systems of an automobile.

Furthermore, this invention may be used not only for a radio telephone system capable of being connected through a telephone switching system but also for direct communication systems wherein no switching of communication paths is involved such as in so-called "walkie-talkie" systems or other forms of radio communication not involving a base station.

DETAILED DESCRIPTION

A preferred embodiment of the present invention applied in a mobile telephone will be described with reference to the accompanying drawings. The present invention may likewise be employed in other kinds of radio telephone apparatus.

Figure 1:
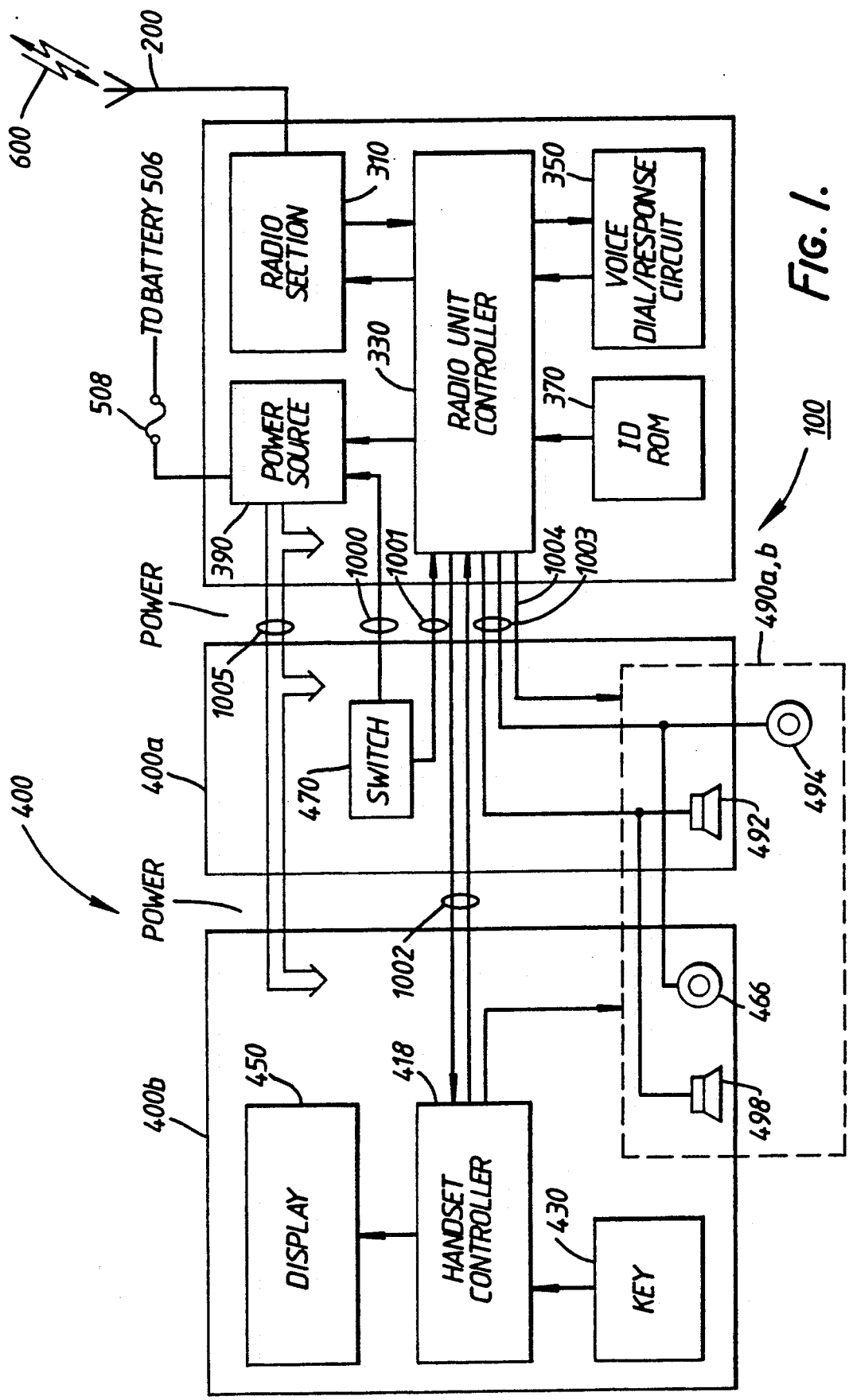
FIG. 1 is a block diagram showing an arrangement of a mobile telephone apparatus according to an embodiment of the present invention.

FIG. 1 is a block diagram showing an arrangement of a mobile telephone apparatus according to an embodiment of the present invention.

Figure 2:
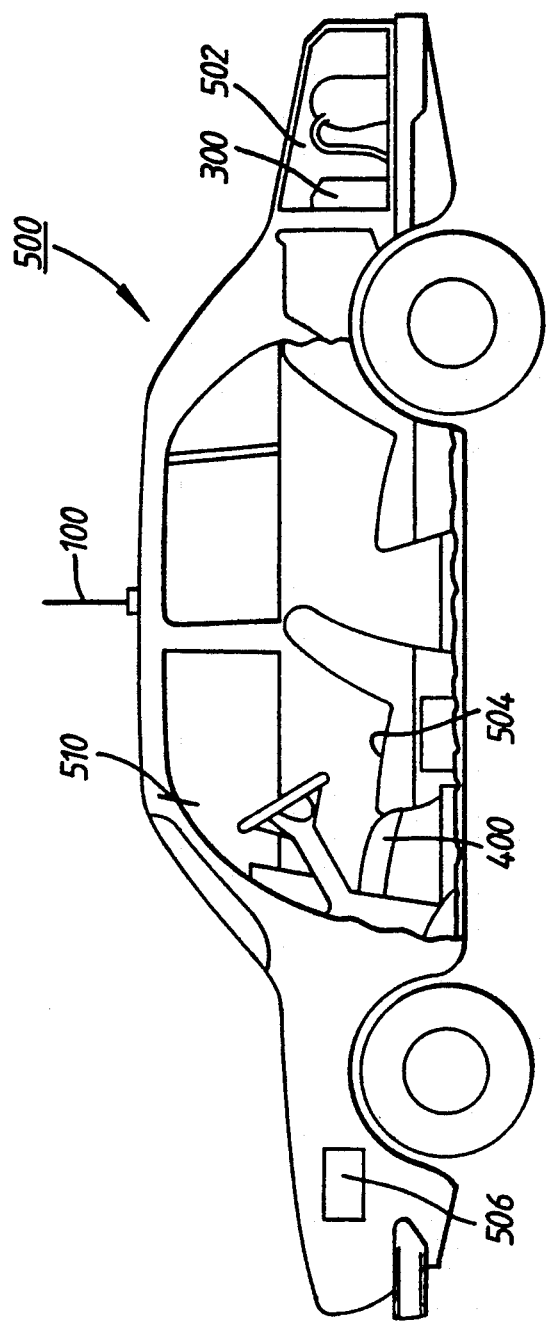
FIG. 2 is a cross-sectional view of an automobile showing the installation of a mobile telephone apparatus therein.

Referring to FIG. 1, mobile telephone apparatus 100 comprises antenna 200, radio unit 300, and telephone unit 400. As shown in FIG. 2, antenna 200 is mounted on an outer body surface of automobile 500. Telephone unit 400 is mounted near driver's seat 504 inside automobile 500.

Radio unit 300 mainly comprises radio section 310 for establishing a first and a second radio channel 600 with a base station (not shown) through antenna 200 and for exchanging signals therewith, radio unit controller 330 for controlling the overall operations of the apparatus, voice recognition/response circuit 350 for performing speech recognition and synthesis and for storing speech pattern signals, ID ROM 370 for storing ID (Identification Number) and telephone numbers, and power source 390 for supplying power from battery 506 (FIG. 2) mounted in the automobile to the above components through fuse 508.

Telephone unit 400 mainly comprises handset controller 418 for controlling the overall operations of telephone unit 400 in response to instructions or the like from radio unit controller 330, key unit 430 for entering key inputs, display unit 450 for displaying numerical or alphabetical characters in response to the control of handset controller 418, switches 470 for performing various switching operations, and selectable audio input/output units 490 $a$ or $b$ for inputting or outputting an audible sound. Telephone unit 400 may be divided into main unit 400$a$ and handset 400$b$. Microphone 494 may be a hands-free microphone 494 mounted on sun visor 510 or the like near driver's seat 504 and is connected to main unit 400$a$. Loudspeaker 492 may be mounted in main unit 400$a$. Handset controller 418, key unit 430, and display unit 450 are mounted in handset 400$b$. Handset microphone 466 and handset receiver 498 constitute audio input/output unit 490$b$ of handset 400$b$.

Each section of radio unit 300, main unit 400$a$, and handset 400$b$ is supplied power by way of a power line 1005 extending from power source 390 in radio unit 300. The opened or closed status of switches 470 is transmitted to power source 390 or radio unit controller 330 by way of line 1000 or line 1001 respectively. Control or command signals are transmitted between handset controller 418 and radio unit controller 330 by way of line 1002. Audio signals are transmitted by way of lines 1003. Radio unit controller 330 sends control signals to audio input/output unit 490$a$, $b$ by way of lines 1004.

Figure 3:
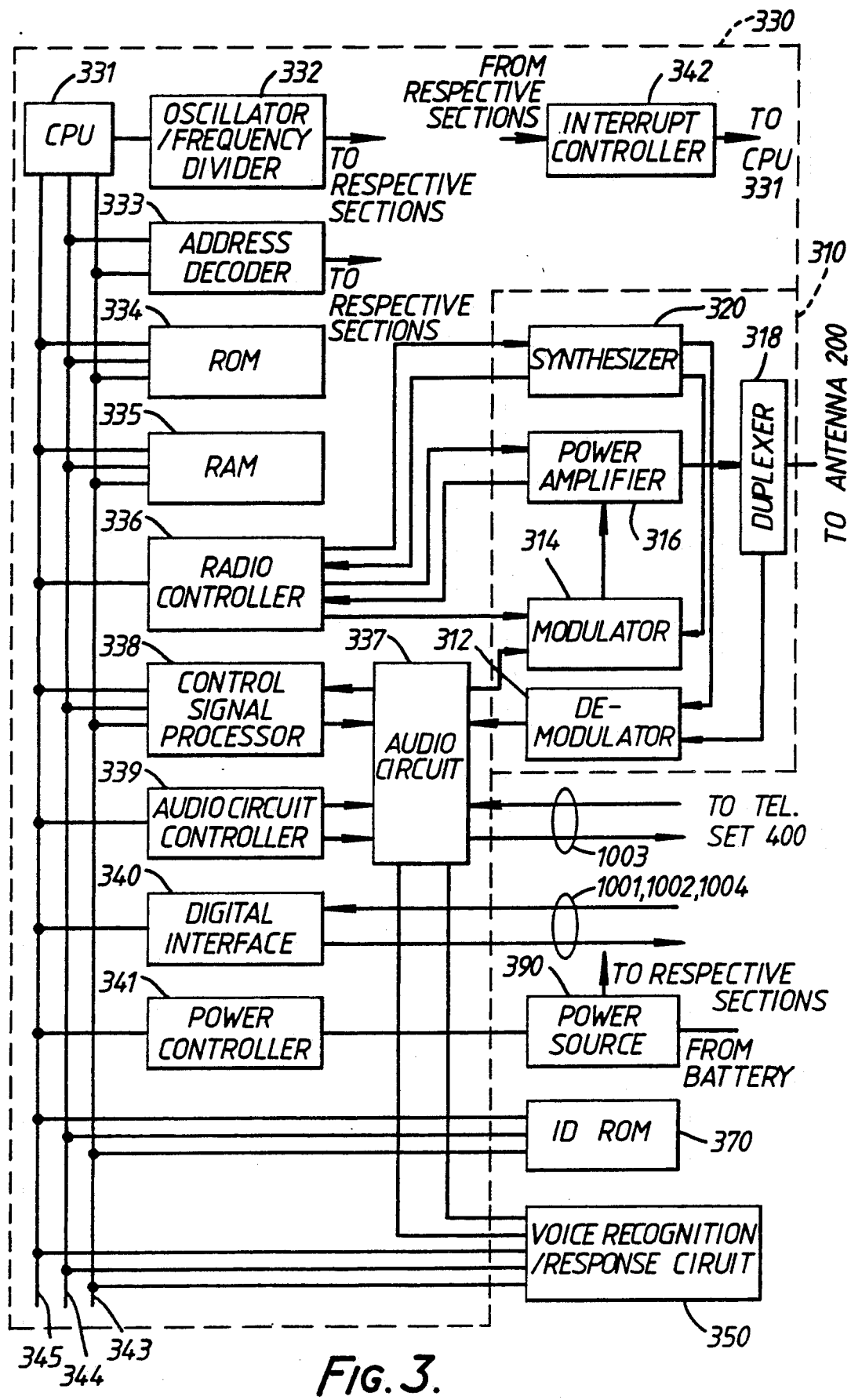
FIG. 3 is a block diagram of a radio unit 300 shown in FIG. 1.

FIG. 3 is a block diagram showing a detailed arrangement of the radio unit of FIG. 1.

Referring to FIG. 3, radio section 310 comprises demodulator 312, modulator 314, and synthesizer 320. Demodulator 312 demodulates a radio signal received from the base station through radio channels 600, antenna 200, and duplexer 318. It should be noted that this signal includes audible sound signals and control signals. Modulator 314 modulates the audio and control signals and the like from audio controller 330 and generates transmission signals.

Power amplifier 316 amplifies the transmission signals from modulator 314. The amplification of power amplifier 316 may be continuous or step-wise variable, e.g., 8-step variable. Duplexer 318 sends the signals received through radio channel 600 and to demodulator 312 and the signals from modulator 314 and power amplifier 316 to antenna 200. Synthesizer 320 comprises a channel selection local oscillator and specifies a frequency from which signals are demodulated by demodulator 312 and a frequency to which signals are modulated by modulator 314. About 666 channels are available for synthesizer 320.

Radio unit controller 330 comprises central processing unit (CPU) 331, oscillator/frequency divider 332, address decoder 333, ROM 334, RAM 335, radio controller 336, audio circuit 337, control signal processor 338, audio circuit controller 339, digital interface 340, power controller 341, and interrupt controller 342. Reference numeral 343 denotes a data bus; 344, an address bus; and 345, a contol bus. CPU 331 controls the operations of radio unit controller 330. Oscillator/frequency divider 332 supplies clock signals to CPU 331 and divides the clock signals so as to supply appropriately frequency-divided pulses as timing pulses to each section of the mobile telephone apparatus requiring them. Address decoder 333 outputs predetermined operation signals to the components in response to instruction signals from CPU 331. ROM 334 stores various programs required for operation of CPU 331. RAM 335 stores various kinds of data during processing by CPU 331. Radio controller 336 controls radio section 310 in response to instructions from CPU 331. For example, radio controlle controller 336 sends signals indicative of available frequencies to the synthesizer 320, signals indicative of an amplification level to power amplifier 316, and signals indicative of modulation parameters to modulator 314. Radio controller 336 receives a step-out signal from synthesizer 320 and output power detection signals from power amplifier 316 and forwards them to CPU 331, thereby preventing operation errors.

Audio circuit 337 extracts control signals and audio signals from the received signals demodulated by demodulator 312 and supplies the control signals to control signal processor 338 and the audio signals to voice recognition/response circuit 350 and telephone unit 400. Audio circuit 337 also supplies the control signal from control signal processor 338 and audio signals from telephone set 400 and voice recognition/response circuit 350 to modulator 314. It should be noted that audio circuit 337 also arranges the wave form of the control signal to be sent to control signal processor 338 in a particular signal format and filters the control signal to be supplied to modulator 314. Control signal processor 338 acquires bit and frame synchronization with the control signal from audio circuit 337. Maintaining the acquired synchronization, control signal processor 338 converts the serial control signals including control data received from a base station into parallel signals and converts the parallel control data signals to be transmitted to a base station into serial signals. The control signals are sent to and from the base station via audio circuit 337.

Audio circuit controller 339 controls audio circuit 337. For example, under the control of audio circuit controller 339, audio circuit 337 selectively applies the received signals from demodulator 312 to control signal processor 338, to voice recognition/response circuit 350, and to telephone unit 400 and selectively receives the signals from control signal processor 338, voice recognition/response circuit 350, or telephone unit 400. Digital interface 340 interfaces data communication between radio unit 300 and telephone unit 400. Power controller 341 controls power source 390. For example, power controller 341 sets a voltage supplied from battery 506 to power source 390 to a predetermined level. The voltage having the predetermined level is supplied to the respective components.

Voice recognition/response circuit 350 comprises a voice recognition circuit for recognizing words spoken by a user, a speech synthesis circuit for synthesizing voice messages, a DTMF receiver for recognizing received DTMF signals, and a voice response circuit for reproducing a user's voice.

Figure 4A:
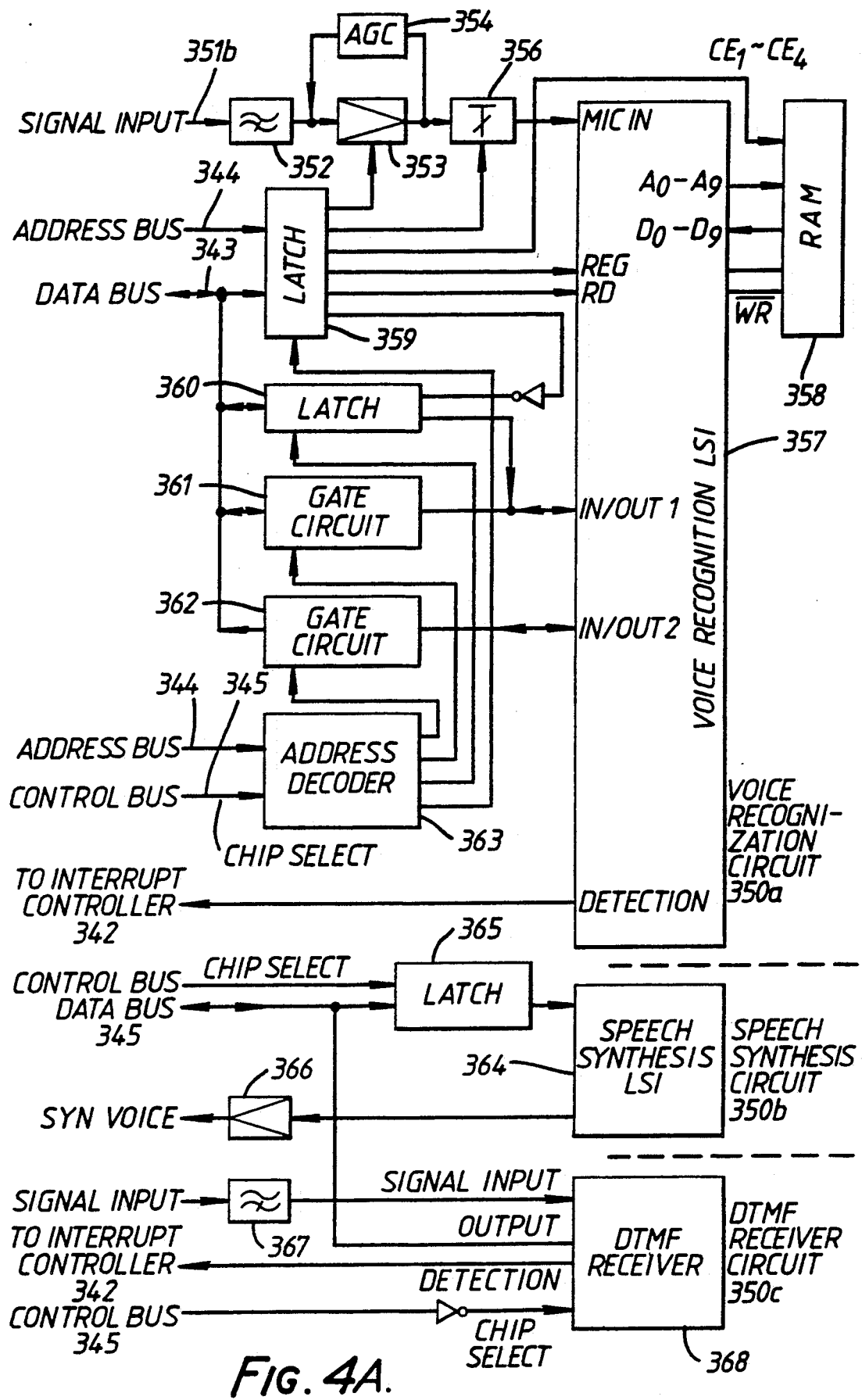
FIGS. 4A and 4B are block diagrams of voice recognition/response circuit 350 shown in FIG. 3.

FIG. 4A, is a block diagram of voice recognition circuit 350a, speech synthesis circuit 350b, and DTMF receiver circuit 350C of voice recognition/response circuit 350.

Voice recognition circuit 350a comprises a high-pass filter 352 for eliminating high-frequency components of signal, amplifier 353 for amplifying the output signal of high-pass filter 352 responsive to an amplification control signal from CPU 331, automatic gain control (AGC) circuit 354 for controlling the output power of amplifier 353, attenuator 356 for attenuating the output signal of amplifier 353 responsive to an attenuator control signal from CPU 331, speech recognition LSI 357, RAM 358, latches 359 and 360, gate circuits 361 and 362, and address decoder 363. LSI as used in the specification refers to large scale integrated circuits; however, integration on such a scale is exemplary and may be replaced with developing technology. Voice recognition LSI 357 recognizes speech signals. RAM 358 stores data or a word to be recognized in voice recognition LSI 357. Latch 359 latches the amplification control signal, the attenuator control signal, chip enable signals CE1–CE4 to RAM 358. It also latches a registration signal and a read signal to voice recognition LSI 357, and a latch signal to latch 360, which are transmitted via address bus 344 and data bus 343 from CPU 331. IN/OUT 1, 2 terminals of voice recognition LSI 357 are connected with data Bus 343 via gate circuits 361, 362. Latching in latches 359, 360 and gating in gate circuits 361, 362 are controlled by control signals transmitted via address decoder 363 by way of address bus 344 and control bus 345.

Figure 5A:
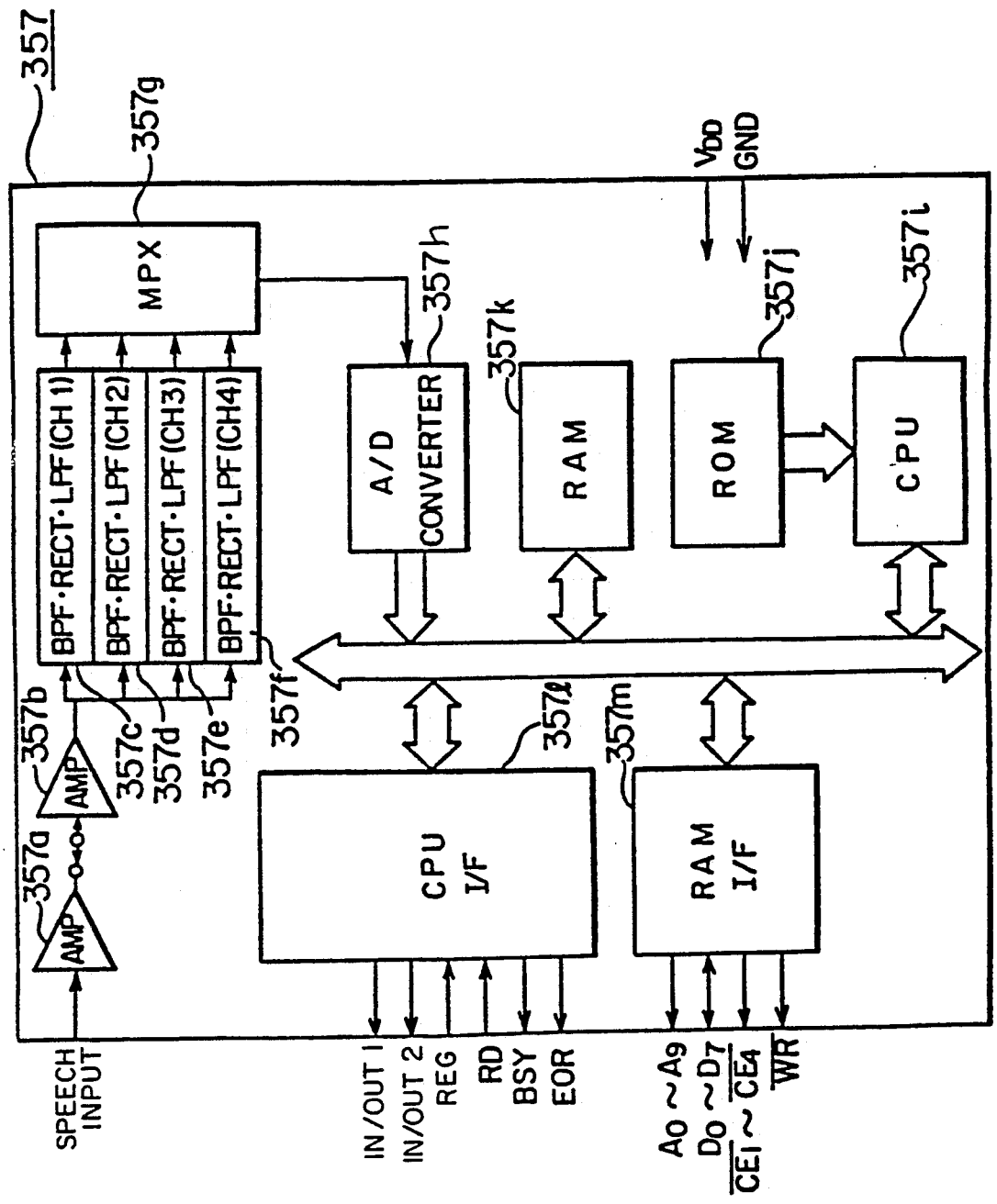
FIG. 5A is a block diagram of speech recognition LSI 357 shown in FIG. 4A.

FIG. 5A is a detailed block diagram of voice recognition LSI 357.

Referring to FIG. 5, speech recognition LSI 357 comprises two amplifiers 357a and 357b, four band-pass filters 357c, 357d, 357e, and 357f, multiplexer 357g, analog to digital (A/D) converter 357h, CPU 357i, ROM 357j, RAM 357k, CPU interface 357l, and RAM interface 357m.

Amplifiers 357a and 357b amplify the input speech signal. The gain value of each of amplifiers 357a and 357b is, for example, 10. Band-pass filters 357c, 357d, 357e, and 357f filter the amplified voice signal. Band-pass filters 357c, 357d, 357e, and 357f filter the amplified speech signal. The center frequencies of band-pass filters 357c, 357d, 357e, and 357f are respectively 0.5 kHz, 1 kHz, 2 kHz, and 4 kHz. Multiplexer 357g multiplies the speech signal output filtered through band-pass filters 357c, 357d, 357e, and 357f. A/D converts the multiplexed speech signal into a digital signal. CPU 357i controls the overall operations of voice recognition LSI 357. Rom 357j stores various kinds of programs to be required for the operation of CPU 357i. RAM 357k stores various kinds of data during control of CPU 357i. CPU interface 357 interfaces data communication with CPU 331 in radio unit controller 330. RAM interface 357m interfaces with RAM 358 (FIG. 4A).

At the time of voice recognition, the sampled, quantized, coded speech signal supplied through amplifiers 357a and 357b, band-pass filters 357c, 357d, 357e, and 357f, multiplexer 357g, and A/D converter 357h are temporarily stored in RAM 357k. It should be noted that a portion of speech signal having a level over a predetermined value is identified as one speech pattern and detected by CPU 357i and thereby only speech pattern signal between the head position and the end position are stored in RAM 357K. A sampling rate at which A/D converter 357m converts an analogue signal supplied thereto to a digital signal is fixed. Accordingly the number of data samples of one voice pattern stored in RAM 357k depends on the length of the voice pattern. Next CPU 357i extracts a predetermined number of data samples (i.e., 16) from the data samples of one voice pattern stored in RAM 357k by discriminating appropriately, so that the extracted data samples represent the voice pattern. In other words the voice patterns are normalized over time. Meanwhile, CPU 357*i* loads stored data from RAM 358 via RAM I/F 357*m* one voice pattern at a time. It should be noted that the stored data in RAM 358 corresponding to each voice pattern consists of the above-mentioned predetermined number of data samples. CPU 357*i* compares data samples of one voice pattern from RAM 357*k* with the corresponding data of one voice pattern from RAM 358 and calculates the sum of differences between them one voice pattern at a time speech pattern. After calculating the sum of difference for each voice pattern in RAM 358, CPU 357*i* determines which voice pattern in RAM 358 is the most similar to the voice pattern from RAM 357*k*, i.e., a voice pattern whose sum is the smallest is selected. And CPU 357*i* determines whether the sum of the selected one exceeds a predetermined value or not. If the sum of differences for the selected voice pattern one does not exceed the value, CPU 357*i* concludes that the voice pattern in RAM 358 is substantially identical to that in RAM 357*k* and sends a detection signal to CPU 331 via interrupt controller 342 and outputs a data code, which is an address data where the identical voice pattern is stored and corresponds to the recognized voice, from IN/OUT 1, 2 terminals. Referring again to FIG. 4A, the data code is transmitted via gate circuits 361, 362 and by way of data bus 343 to CPU 331.

Speech synthesis circuit 350*b* comprises speech synthesis LSI 364 for generating predetermined speech patterns on the basis of the data sent from CPU 331 in radio unit controller 330, latch 365, and amplifier 336 for amplifying the synthesized speech patterns.

Figure 6:
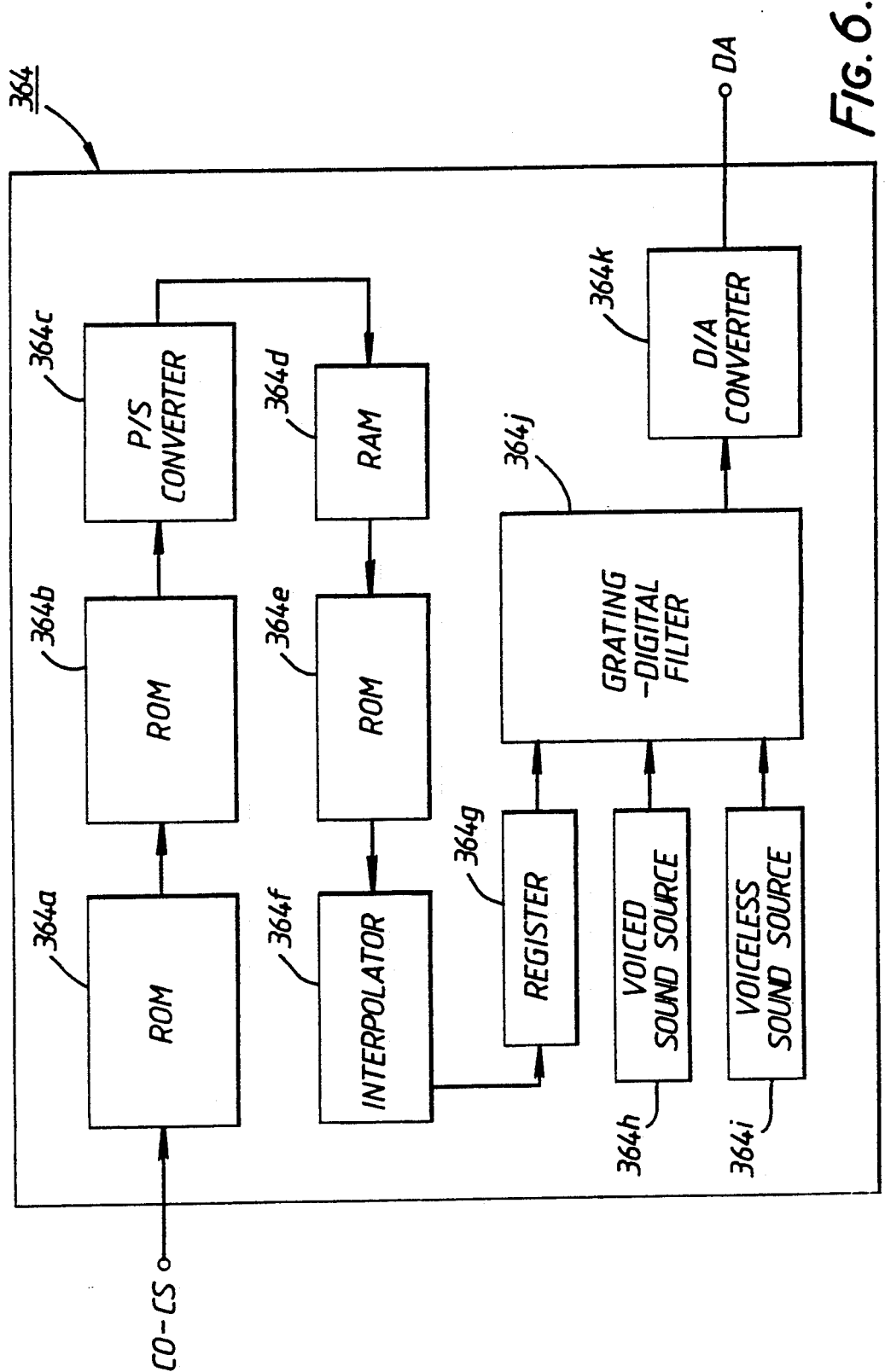
FIG. 6 is a block diagram of speech synthesis LSI 364 shown in FIG. 4A.

FIG. 6 is a detailed block diagram of speech synthesis LSI 364.

Referring to FIG. 6, speech synthesis LSI 364 comprises ROM 364*a* indirectly addressed by a predetermined code, ROM 364*b* for storing speech parameters, parallel/serial (P/S) converter 364*c* for converting parallel signals to serial signals, RAM 364*d* for storing one-frame parameters, ROM 364*e* for storing nonlinear decoding parameters, i.e., pitch, noise, and amplitude, interpolator 364*f* for interpolating parameters every predetermined interval, register 364*g* for storing parameters and performing arithmetic operations, voiced sound source 364*h*, voiceless sound source 364*i*, grating digital filter 364*j*, and D/A converter 364*k*.

Referring to FIG. 4A, DTMF receiver circuit 350*c* comprises high-pass filter 367 and DTMF receiver 368. DTMF receiver 368 receives a DTMF signal included in the speech signal through high-pass filter 367 and recognizes the two selected tones of the DTMF signal.

Figure 5B:
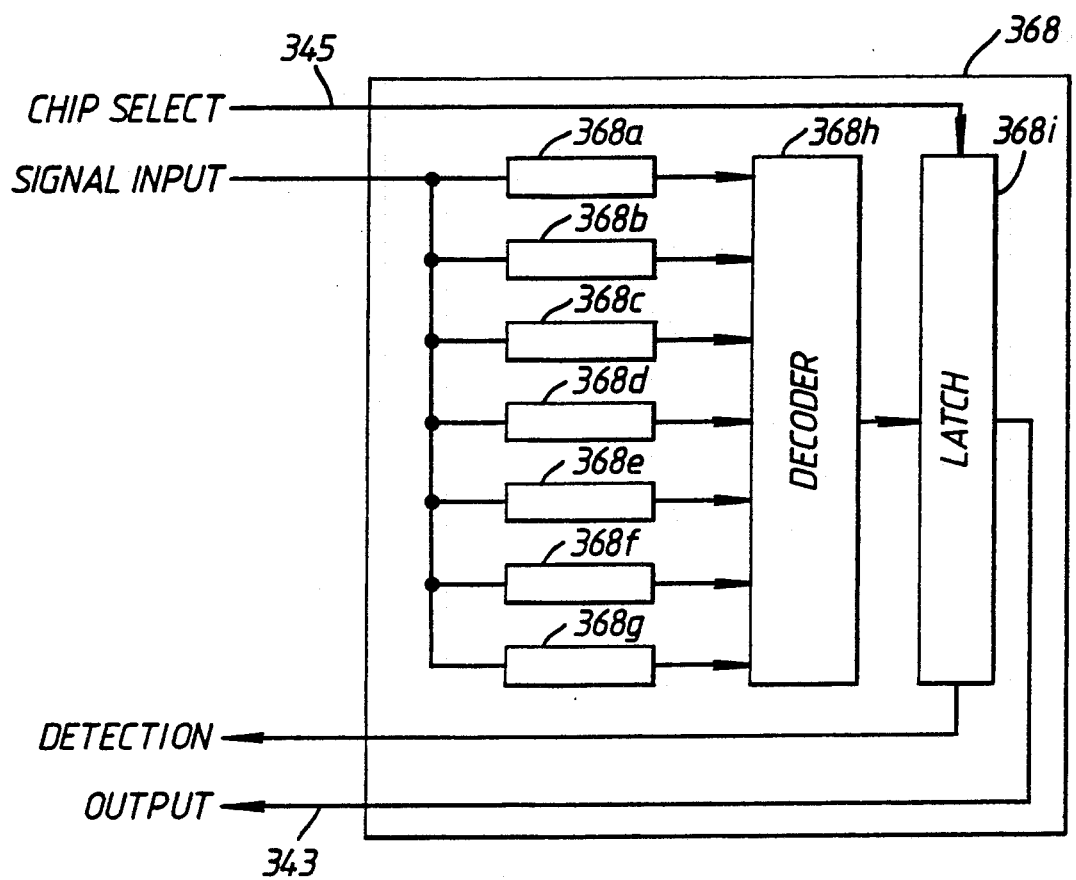
FIG. 5B is a block diagram of DTMF receiver 368 shown in FIG. 4A.

FIG. 5B is a detailed block diagram of DTMF receiver 368.

Referring to FIG. 5B, DTMF receiver 368 comprises filters 368*a*-*g* for filtering input signals to recognize the seven possible different tones of a DTMF signal, decoder 368*h* for decoding the output of filters 368*a*-*g*, and latch 368*i* for latching the output of decoder 368*h* responsive to a chip select signal sent from CPU 331 by way of control bus 345 and for outputting a data code corresponding to a detected DTMF signal to CPU 331 by way of data bus 343 after sending a detection signal to CPU 331 via interrupt controller 342.

Figure 4B:
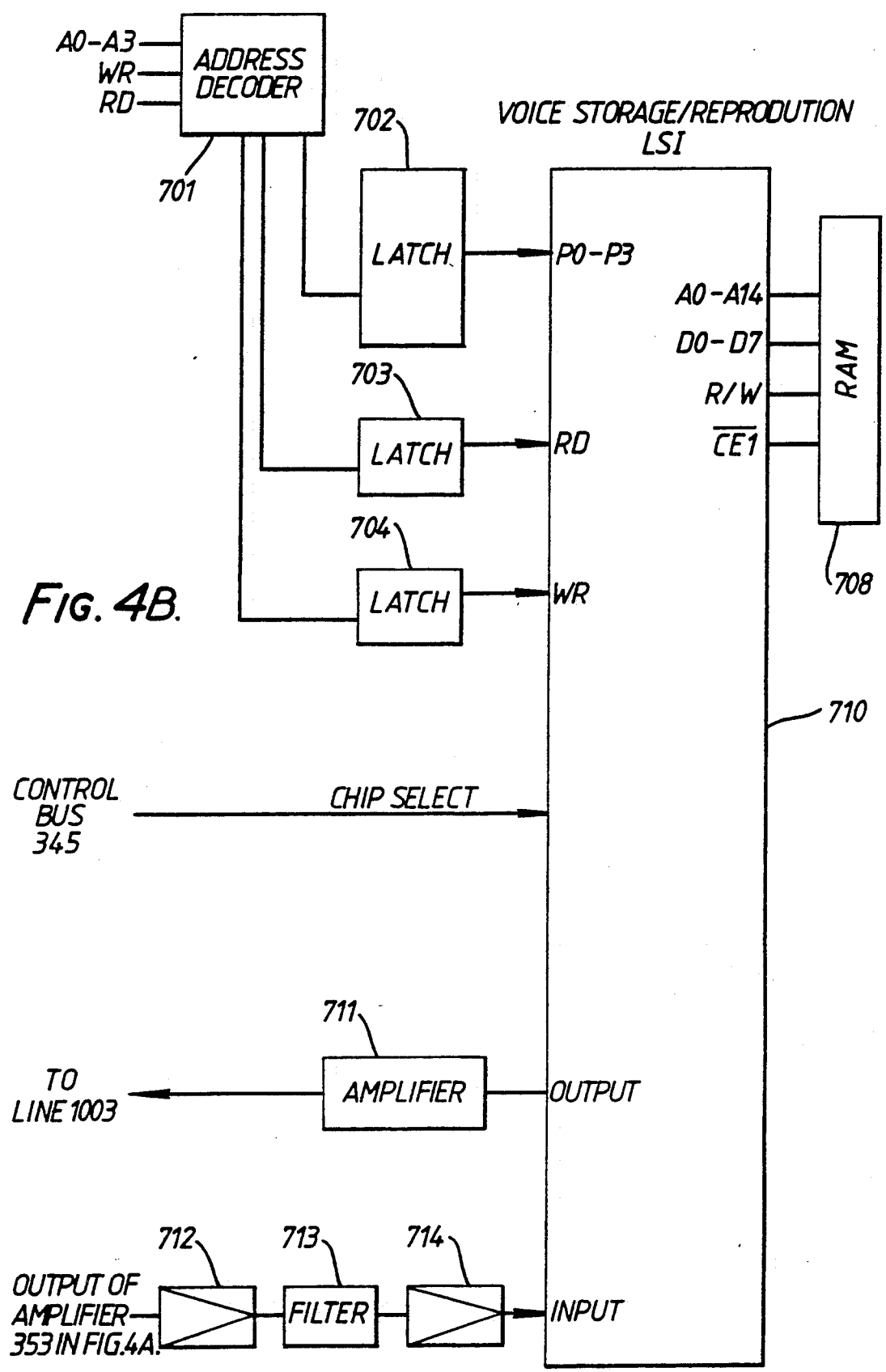

FIG. 4B is a block diagram of voice response circuit 350*d* in voice recognition/response circuit 350.

Referring to FIG. 4B, the voice response circuit comprises address decoder 701 for decoding address signals A0–A3 via address bus 344 and control signals WR and RD via control bus 343 from CPU 331, latches 702–704 for temporarily storing signals from address decoder 701 and for providing these signals as 'P0-P3', 'RD', 'WR', to voice storage/reproduction LSI 710. RAM 708 stores voice pattern data of user spoken words which may be reproduced in the below discussed selective reception mode when a caller spoken password matches a stored one according to voice storage/reproduction LSI 710 writing and reading data samples of the voice pattern. Amplifier 711 amplifies the output of voice storage/reproduction LSI 710. Amplifier 712 amplifies signals applied to voice storage/reproduction LSI 710. Filter circuit 713 filters the output of amplifier 712, and amplifier 714 amplifies the output of filter circuit 713 and provides the amplified output to voice storage/reproduction LSI 710. The output of amplifier 353 (FIG. 4A) is applied to the input of amplifier 712.

Figure 5C:
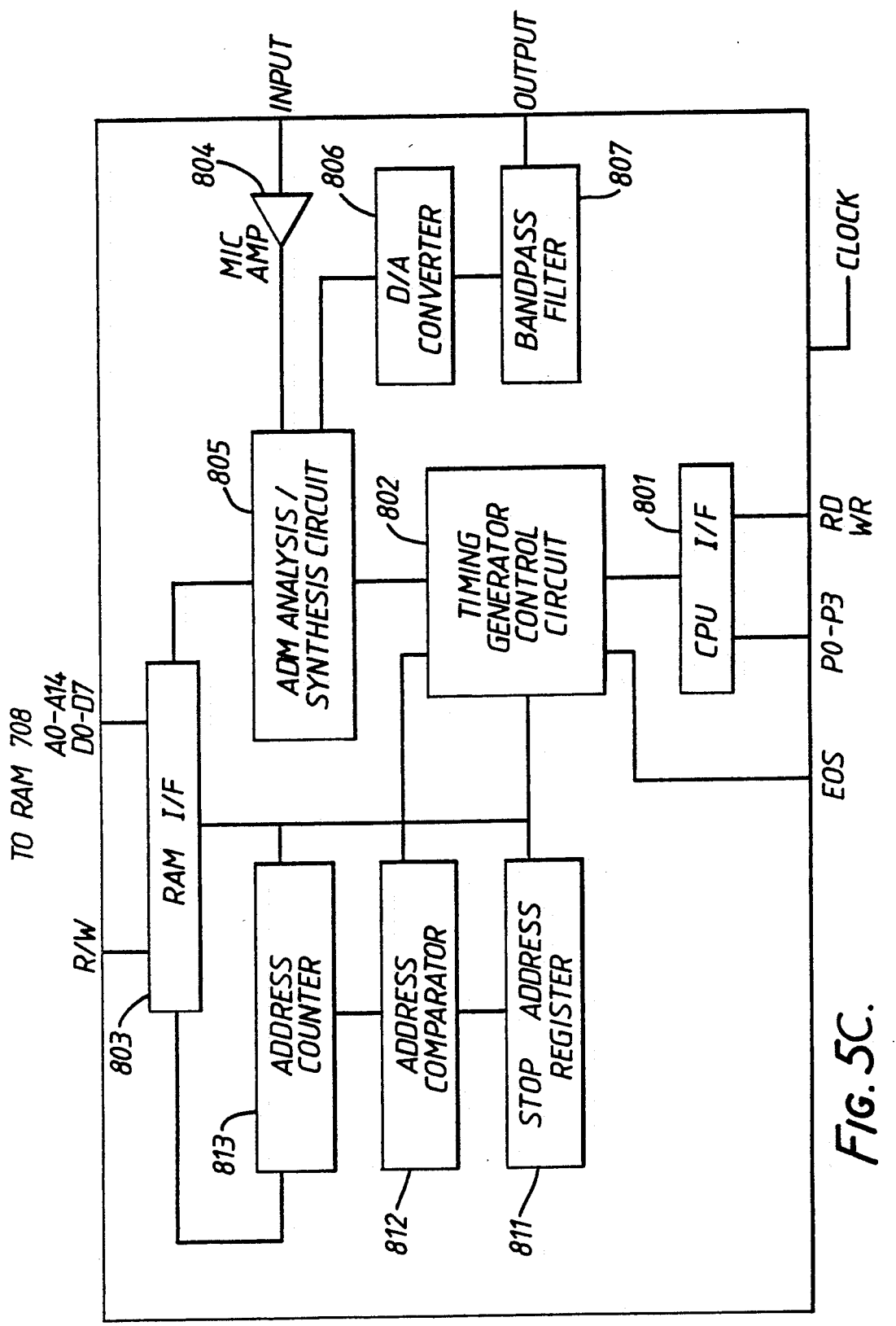
FIG. 5C is a block diagram of voice storage/reproduction LSI 710 shown in FIG. 4B.

FIG. 5C is a block diagram of the voice storage/reproduction LSI 710.

In the case of storing voice signals, a signal WR and an address signal P0–P3 indicative of locations for voice data to be stored are sent from CPU 331 to CPU I/F 801. Responsive to these signals, timing generator control circuit 802 accesses the locations addressed by the address signal in RAM 708 (FIG. 4B) via RAM I/F 803. A voice signal applied to INPUT is amplified at MIC AMP 804 and analyzed by adaptive delta modulation (ADM) processing in ADM analysis/synthesis circuit 805. An analyzed voice signal is sequentially sent to the RAM 708 and stored in the addressed locations.

In the case of reproducing voice signals a real signal RD and a data code corresponding to an address are sent from CPU 331 to CPU I/F 801. Responsive to these signals, timing generator control circuit 802 sets the end address, which is larger than the transmitted address by a predetermined value, in stop address register 811 and accesses the locations addressed by the address (the data code) in RAM 708 via RAM I/F 803. Data in the accessed location are loaded into ADM analysis/synthesis circuit 805 via RAM I/F 803. ADM analysis/synthesis circuit 805 synthesizes a digital speech signal in response to the loaded data. The output of ADM analysis/synthesis circuit 805 is applied to D/A converter 806 and converted into an analogue voice signal therein. The analogue signal is output via bandpass filter 807. The address of the location accessed in RAM 708 is contiguously incremented by address counter 813 until it equals the end address set in stop address register 811. Thereby voice data in RAM 708 may be sequentially loaded into speech storage/reproduction LSI 710 and a voice signal may be reproduced.

Figure 7:
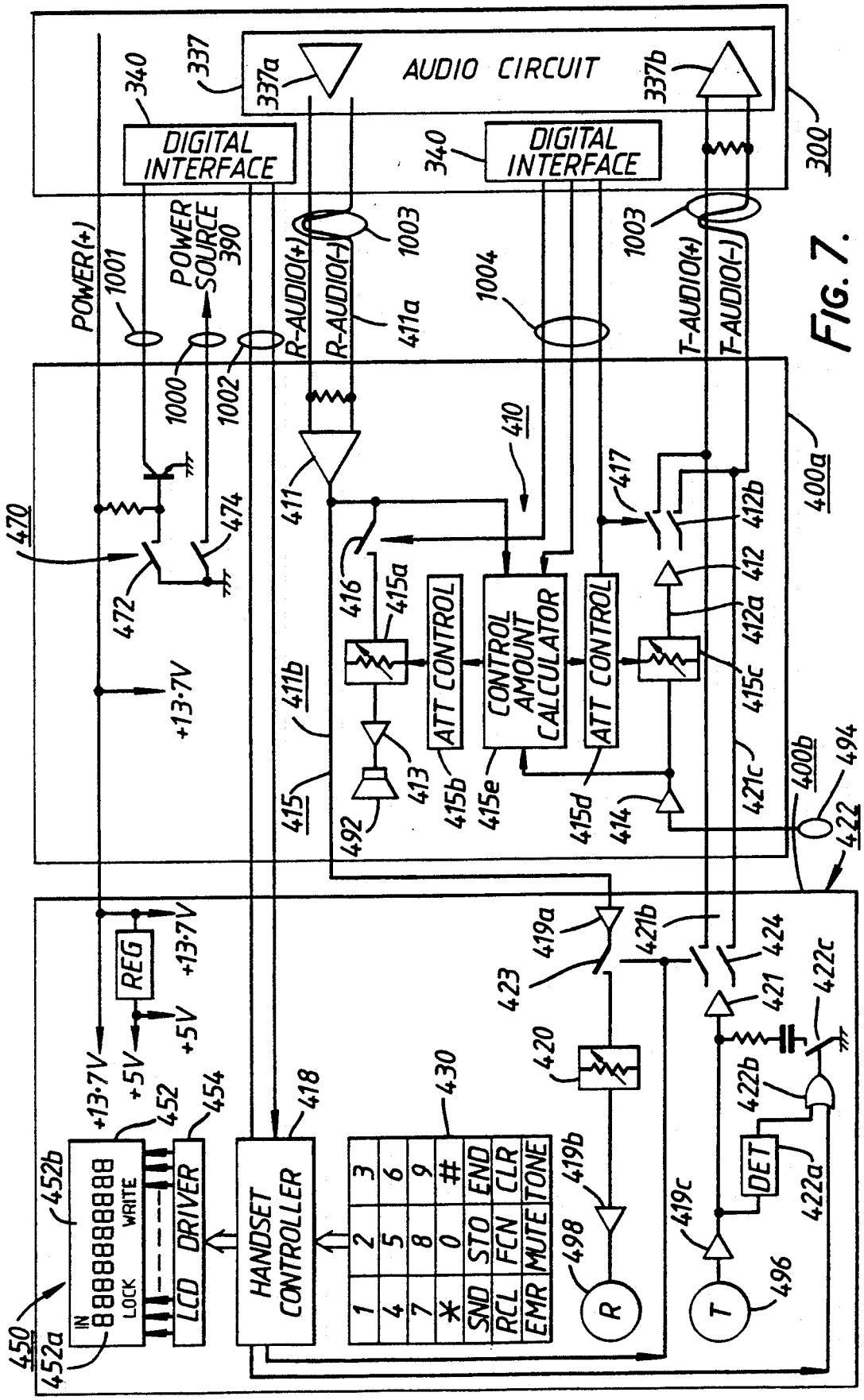
FIG. 7 is a block diagram mainly showing telephone unit 400 shown in FIG. 1.

FIG. 7 is a detailed view of the telephone unit 400 described above.

Referring to FIG. 7, main unit 400*a* mainly comprises audio controller 410, speech input/output unit 490*a*, and switch unit 470. Audio controller 410 mainly comprises balanced to unbalanced line B/U converter 411, U/B converter 412, amplifiers 413 and 414, echo canceler 415, and switches 416 and 417. Speech input/output unit 490*a* comprises hands-free microphone 494 and loudspeaker 492. Switch unit 470 comprises hook switch 472 and on/off switch 474.

Balanced line to unbalanced line (B/U) converter 411 converts the speech signals sent from audio circuit 337 in radio unit 300 through balanced line 411*a* into signals on unbalanced line 411*b*. The speech signal converted into the signals on unbalanced line 411*b* are amplified by amplifier 413 and output via loudspeaker 492. Since the speech signal outputs from the audio circuit in the radio unit are the signals on the unbalanced line, the speech signals are converted into the signals on the balanced line by U/B converter 337a arranged in the immediate output stage of the audio circuit 337. The speech signal inputted at hands-free microphone 494, amplified by amplifier 414, and appearing on unbalanced line 412a are converted into signals on balanced line 412b. The speech signals converted into the signals on balanced line 412b are sent to audio circuit 337 through balanced line 412b. The speech signal inputs to audio circuit 337 in radio unit 300 are signals on the unbalanced line, so that the speech signals are converted into signals on the unbalanced line by B/U converter 337b arranged in the immediate output stage of audio circuit 337.

Echo canceler 415 comprises attenuator 415a for attenuating the speech signal input from B/U converter 411 to amplifier 413, attenuation controller 415b for controlling an attenuation level of attenuator 415a, attenuator 415c for attenuating the speech signal input from the amplifier 414 to U/B converter 412, attenuation controller 415d for controlling an attenuation level of attenuator 415c, and control amount calculator 415e for calculating control amounts of attenuation controllers 415b and 415d on the basis of the speech signal on the respective lines. Switch 416 is operated to determine whether the speech signal from B/U converter 411 is to be output from loudspeaker 492. Switch 417 is operated to determine whether the speech signal from hand-free microphone 494 is sent to audio circuit 337 in radio unit 300. The operations of switches 416 and 417 are performed on the basis of control signals output from radio unit controller 330.

Hook switch 472 of switch unit 470 detects the on- or off-hook state of handset 400b. The detected signal is sent to radio unit controller 330 in radio unit 300. On-/off switch 474 performs overall ON/OFF operation of mobile telephone apparatus 100. A switching signal from switch 474 is sent to radio unit controller 330 in radio unit 300.

Handset 400b comprises handset controller 418, display unit 450, key unit 430, and speech input/output unit 490b. Display unit 450 comprises liquid crystal display 452 and LCD driver 454. Key unit 430 comprises a plurality of keys which may be arranged in a key pad. Speech input/output unit 490b comprises amplifiers 419a, 419b, and 419c, an attenuator 420, U/B converter 421, speech switch unit 422c, and switches 423 and 424, handset microphone 496, and handset receiver 498. Handset controller 418 controls the overall operations of handset 400b on the basis of control signals sent from radio unit controller 330 in radio unit 300. At the same time, handset controller 418 sends control signals or the like input from key unit 430 to radio unit controller 330 in radio unit 300. Amplifiers 419a and 419b amplify the speech signal sent from the B/U converter 411 in main unit 400a. Attenuator 420 attenuates the speech signals amplified by amplifers 419a and 419b. The speech signal output through amplifier 419a, attenuator 420, and amplifier 419b is output from handset receiver 498. Amplifier 419c amplifies the speech signal input from handset microphone 496. U/B converter 421 converts the amplified speech signals on unbalanced line 421a into signals on balanced line 421b. The speech signal converted into the signal on balanced line 421b is sent to audio circuit 337 through balanced line 421b and balanced line 421c. Switch 423 is operated to determine whether the speech signal from B/U converter 411 is to be output from handset receiver 498. Switch 424 is operated to determine whether the speech signal from handset microphone 496 is to be output to audio circuit 337 in radio unit 300. The operations of switches 423 and 424 are performed on the basis of the control signal output from handset controller 418 and are interlocked with switches 416 and 417 in main unit 400a.

In a standby mode of mobile telephone apparatus 100, all switches 416, 417, 423 and 424 are turned off. In a sound generation mode for a key input, switch 416 is turned on, and switches 417, 423 and 424 are turned off. When handset 400b is used for communication in the off-hook state, switches 416 and 417 are turned on, and switches 423 and 424 are turned off. Speech switch unit 422 comprises level detector 422a, OR gate 422b, and switch 422c. Level detector 422a detects a signal level of speech signal input to handset microphone 496. If the signal level is less than a predetermined value, level detector 422a generates a signal of level "L". However, if the signal level exceeds the predetermined value, level detector 422a generates a signal of level "H". OR gate 422b receives an output signal L or H from level detector 422a and a predetermined control signal output from controller 418 and generates an OR signal. Switch 422c is turned on in response to the signal of level "L" from OR gate 422b, and speech signal line 421a is grounded. The speech signal from handset microphone 496 is not transmitted to audio circuit 337, and handset microphone 496 is set in the OFF state. Switch 422c is turned off in response to the signal of level "H" from the OR gate 422b, and the handset microphone 496 is set in the ON state. The control signal input from controller 418 to one input terminal of OR gate 422b is set at level "L" in the standby mode and during normal communication and at level "H" in the voice recognition mode allowing voice dialing. Therefore, when no voice is input to handset microphone 496 in the busy state, handset microphone 496 is set in the OFF state. Therefore, noise in the automobile 500 is not sent to the other party and comfortable communication can be achieved.

Liquid crystal display 452 comprises a numerical display element 452a having several display digit positions and display element 452b for displaying various functions. LCD driver 454 drives liquid crystal display 452 under the control of handset controller 418 to display numerical or alphabetical characters. Key unit 430 includes keys including at least numerical keys "0" to "9" as well as function keys "*", "#", "SND", "STO", "END", "RCL", "FCN", "CLR", "EMR", "MUTE", and "TONE". When a desired key is depressed, the depressed key is detected by handset controller 418.

A connection control operation of mobile telephone apparatus 100 will now be described with reference to FIG. 8.

When On/OFF switch 474 in switch unit 470 of telephone unit 400 is turned on, the respective components are powered by power source 390 (step 1101).

Figure 9:
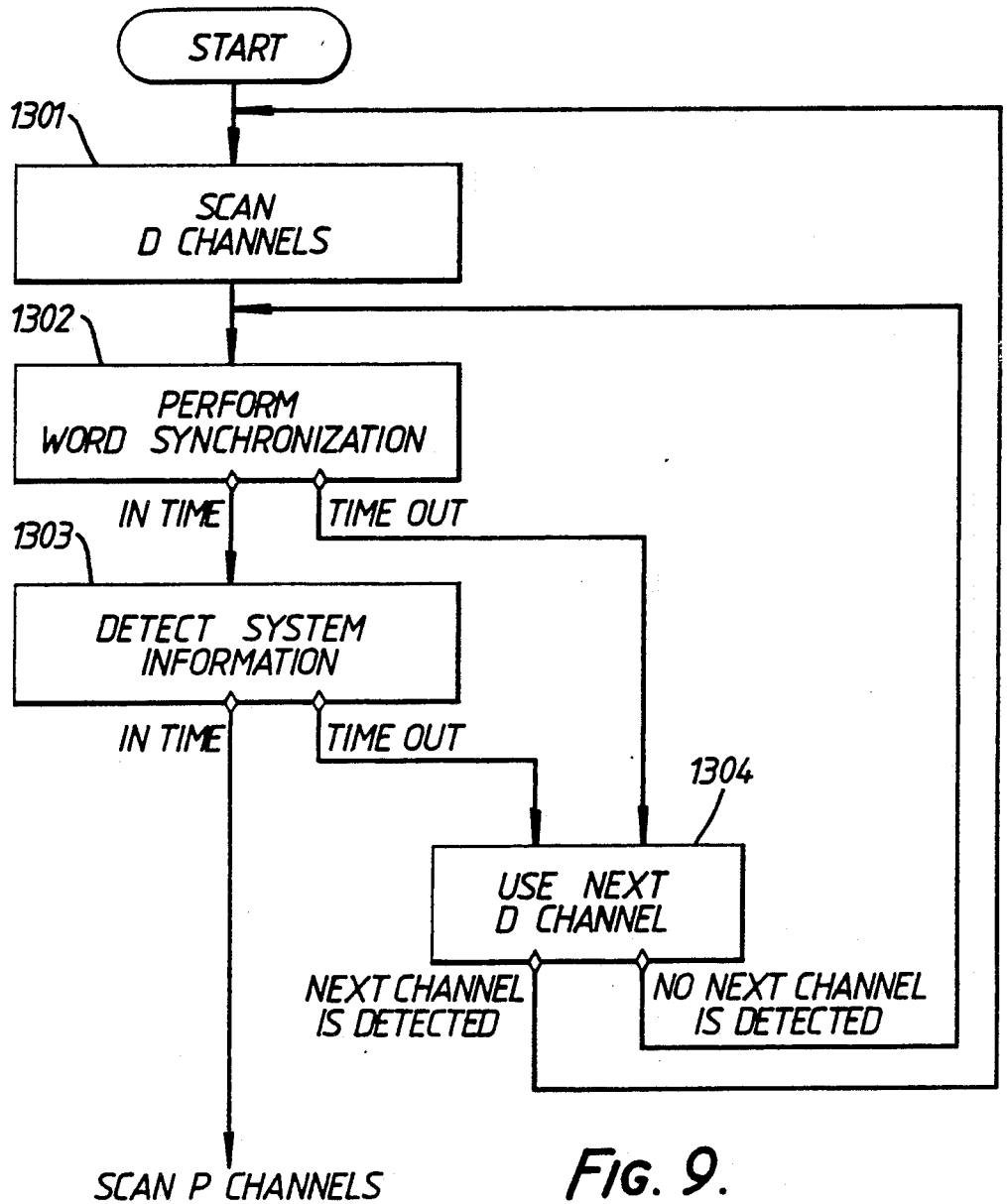
FIG. 9 is a flow chart for explaining initialization step 1102 in the connection control operation of FIG. 8.

FIG. 9 is a detailed flow chart for explaining the initial radio channel connection operation after the power supply is turned on. In response to a control signal from CPU 331, radio controller 336 in radio unit controller 330 controls synthesizer 320 to change the frequency of output therefrom. Thereby a predetermined range of control channels (referred to as D channels hereinafter) is scanned in demodulator 312 to obtain the information indicative of electric field intensity of the received signals over each channel (step 1301).

The channel having the strongest electric field intensity is selected from the D channels and the apparatus is ready for receiving signals through the D channel having the strongest electric field intensity. In this case, information of a channel having the second strongest intensity is also obtained.

Figure 10:
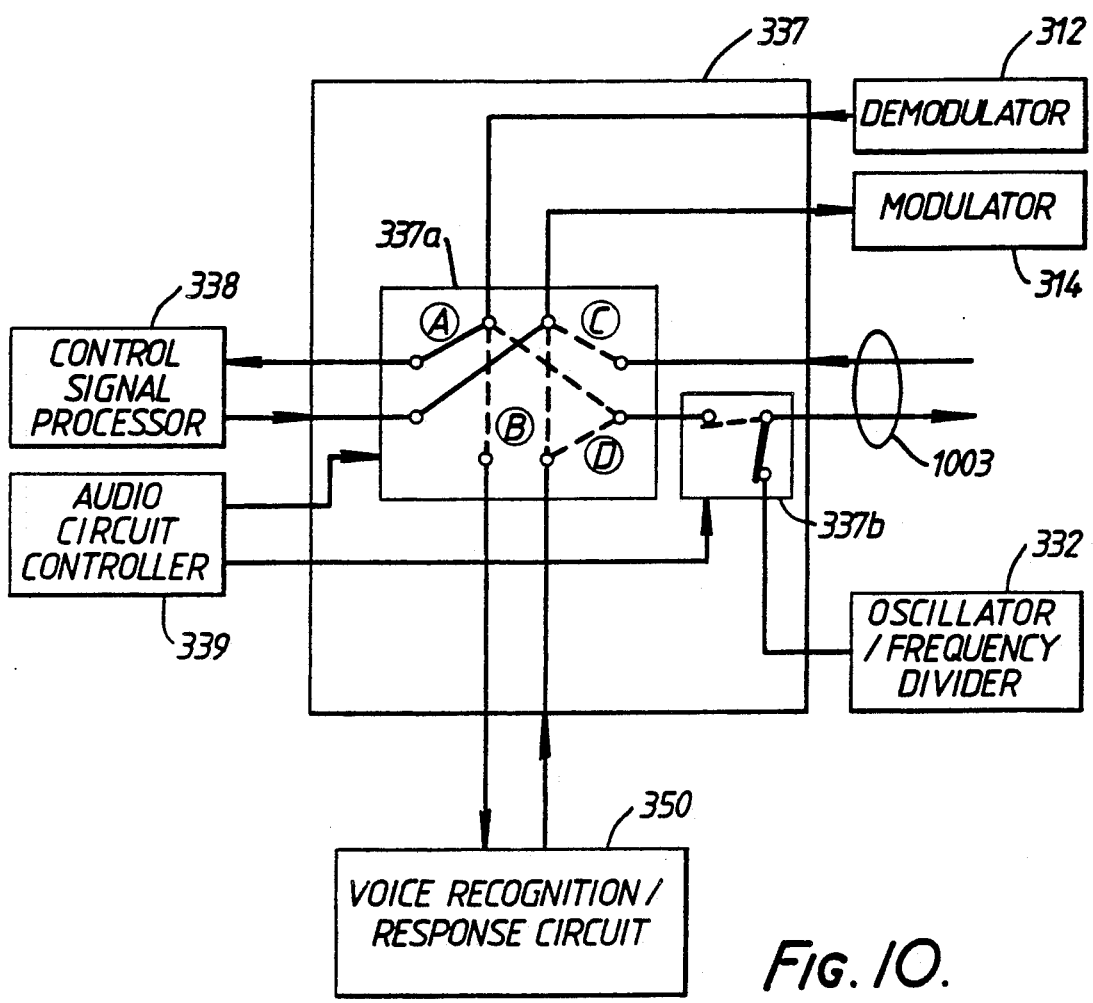
FIG. 10 is a schematic block diagram showing the connection control in audio circuit 337.

At this time, under the control of CPU 331, audio circuit controller 339 controls switching section 337a in audio circuit 337 so that the output of demodulator 312 is applied to the input of control signal processor 338 and the output of control signal processor 338 is applied to the input of modulator 314 as shown in FIG. 10 (connection A in FIG. 10).

Control signal processor 338 performs bit and frame synchronization operations on signals received through the selected D channel (step 1302). Thereby a communication link has been established between the mobile telephone and a base station. System information is then detected in signals through this D channel at control signal processor 338 (step 1303) and sent to CPU 331. The system information includes a range of frequency channels (referred to as P channels hereinafter) to be scanned next.

If the word synchronization or system information reception is not performed within a predetermined period of time, the D channel having the second strongest intensity is used to repeat the above operation (step 1304). In this case, if word synchronization or system information reception is again not performed within the predetermined period of time, the demodulator scans the D channels again (step 1301).

Figure 8:
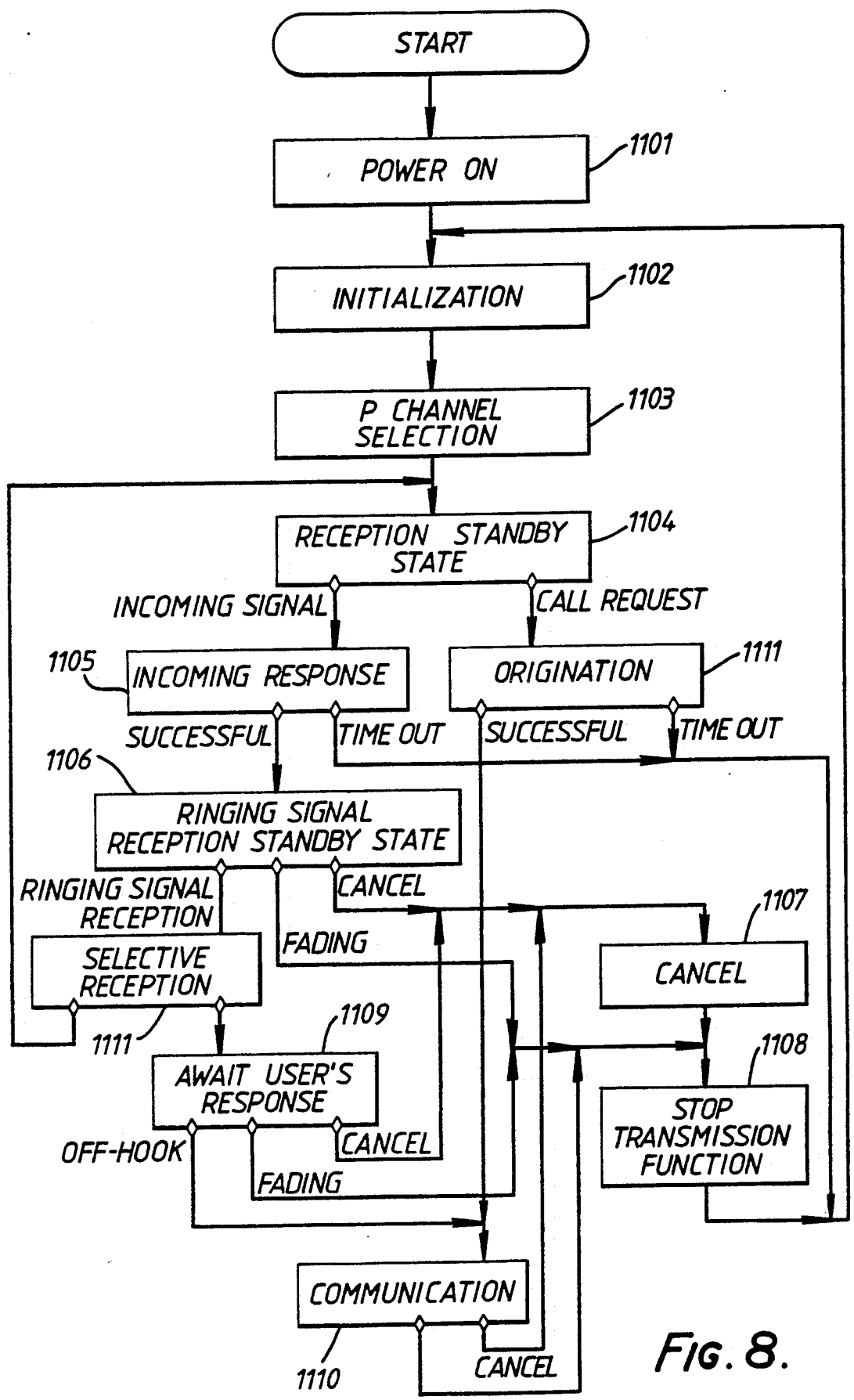
FIG. 8 is a flow chart for explaining a connection control operation.

When the above initialization operations are completed, scanning similar to the above scanning operation is performed against P channels for receiving an incoming signal (step 1103 in FIG. 8).

Figure 11:
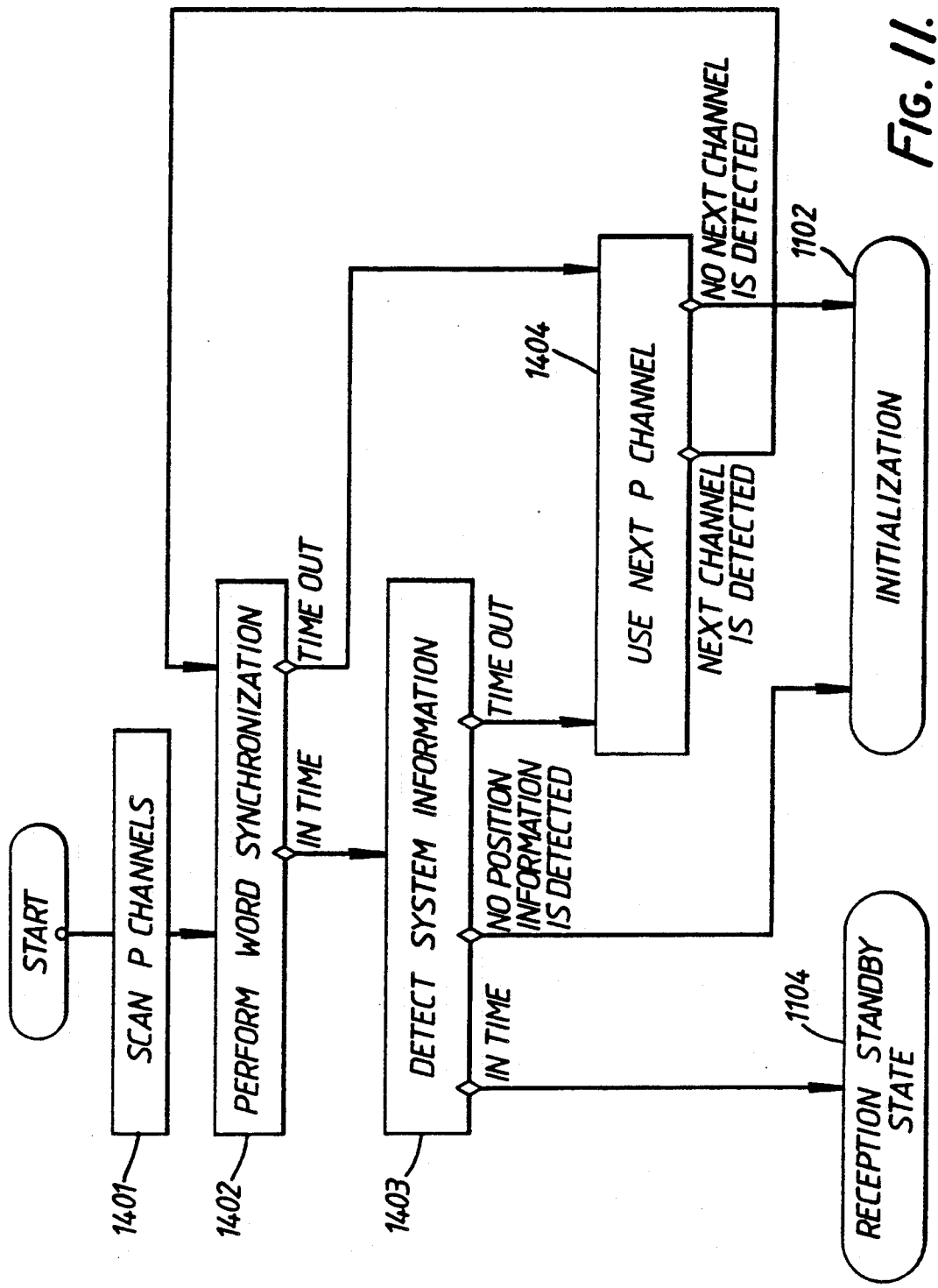
FIG. 11 is a flow chart for explaining operation after initialization in the connection control operation.

FIG. 11 is a detailed flow chart for explaining P channel connection after initialization. Responsive to a control signal from CPU 331, radio controller 336 controls synthesizer 320 to change the frequency of output therefrom so that P channels are scanned in demodulator 312 (step 1401) to obtain the information indicative of electric field intensity of the received signals. The apparatus is ready for receiving information though the P channel of the strongest electric field intensity. In this case, information of the P channel having the second strongest intensity is also obtained.

Control signal processor 338 performs bit and frame synchronization operations on signals received through the P channel which has the strongest electric field intensity (step 1402). After acquiring the synchronization, control signal processor 338 determines whether the following information is addressed to the apparatus by comparing an address code included in the following information with an ID code which has been read from ID ROM 370 via CPU 331 in advance. If it is addressed to the apparatus, control signal processor 338 obtains system information from the following information signals and sends it to CPU 331. This radio channel communication using P channels is also a communication link between the mobile telephone and the base station.

If the word synchronization or system information reception is not performed within a predetermined period of time, the operation similar to the one described above is performed for the P channel having the second strongest intensity (step 1404). In this case, when word synchronization or system information reception is again not performed within the predetermined period of time, initialization is resumed (step 1102). If position information is not obtained from system information, initialization is also resumed (step 1102).

The above connection control operations set the apparatus in the reception standby state (step 1104).

Referring again to FIG. 8, in the reception standby state when an incoming signal indicative of an incoming call is received through the P channel, an acknowledge signal is sent back through a predetermined channel (step 1105). At the same time, scanning of control channels (referred to as A channels hereinafter) for receiving control signals from the base station is performed in the same manner as for D and P channels. A frequency range of A channels is designated in the system information addressed to the apparatus which is obtained from signals transmitted via the P channel.

Responsive to a control signal from CPU 331, radio controller 336 controls synthesizer 320 to change the frequency of output therefrom so that A channels are scanned in demodulator 312 to obtain the information indicative of electric field intensity of the received signal. The apparatus is then ready for receiving information through the A channels having the strongest electric field intensity. Thereafter, control signal processor 338 performs bit and frame synchronization operations, i.e., word synchronization. This radio channel communication using A channels is also a communication link between the mobile telephone and the base station. When a speech channel designation signal is received through the A channels, the channels are switched to the designated speech channels: a forward channel for transmitting audio signals to the base station and a backward channel for receiving audio signals from the calling apparatus via the base station (step 1107). Thereby a communication link has been established between the mobile telephone and the calling apparatus via the base station. The apparatus then waits to receive a ringing signal in the backward channel (step 1106). When the on-hook state is set in the reception standby state, the reception mode of the speech channels is cancelled (step 1107), and the transmission function is disabled (step 1108).

Figure 12:
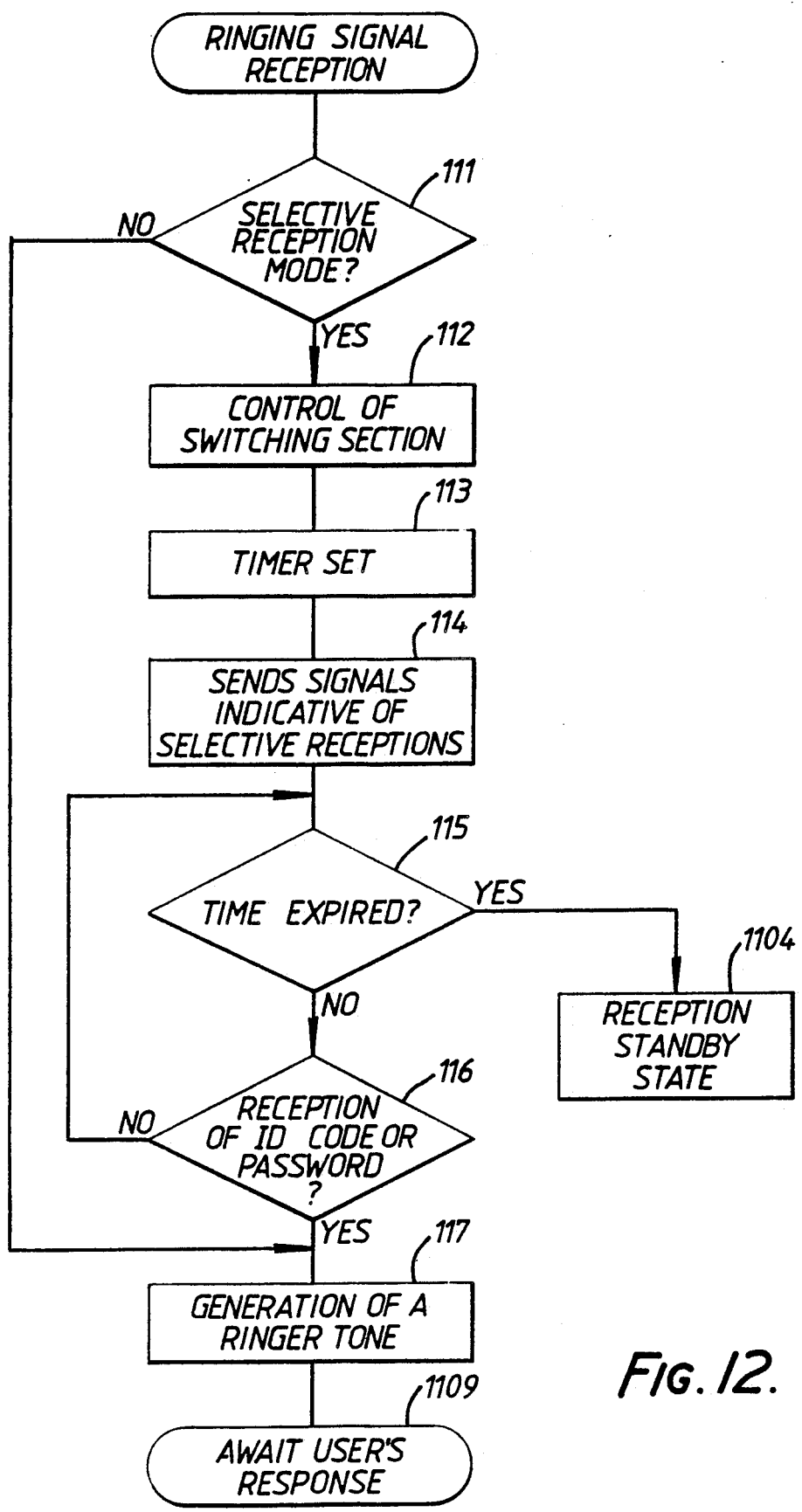
FIG. 12 is a flow chart for explaining a selective reception according to one embodiment.

When the ringing signal is received, the operation of the apparatus proceeds to selective reception (step 1111). The operations of selective reception will be described in detail in reference to FIG. 12, wherein decision box 111 indicates entry into a selective reception mode.

The ringing signal included in the signal received through the backward channel is detected by control signal processor 338. Upon the detection of the ringing signal, control signal processor 338 sends a detection signal to CPU 331. Receiving the detection signal, CPU 331 determines whether the selective reception mode has been set or not (step 1111). This selective reception mode may be set in response to a certain order of key input, for example FCN 2 1 * entered at key unit 430. Responsive to the key input, handset controller 48 sends a mode set signal to CPU 331. Responsive to the mode set signal, CPU 331 sets a mode set flag 335a in RAM 335. Therefore whether the selective reception mode is set or not is determined by checking the mode set flag.

In the event that the mode set flag is set, CPU 331 sends a first connection signal to audio circuit controller 339. Responsive to the first connection signal, audio circuit controller 339 controls switching section 337a in audio circuit 337 so that the output of demodulator 312 is applied to the input of voice recognition/response circuit 350 and the output of recognition/response circuit 350 is applied to the input of modulator 314 (connection B in FIG. 10) as shown in FIG. 10 (step 112).

Also CPU 331 sets an internal timer thereof to zero (step 113). The internal timer is a free running timer clocked in response to a clock pulse signal supplied from oscillator/frequency divider 332.

At the same time, CPU 331 accesses speech synthesis LSI by sending a chip select signal via buses 343–345 so that a predetermined voice message, for example, "Now call receptions are limited. Please input your ID code or speak your password if you know it" is generated from speech synthesis LSI 364. After being amplified in amplifier 366, the generated voice messages are applied to modulator 314 via audio circuit 337 and transmitted from antenna 200 through the forward channel (step 114). The voice messages are transmitted to a calling telephone apparatus via a base station by way of the forward channel. After the transmission of voice message, CPU 331 sends chip select signals to voice recognition LSI 357 and DTMF receiver 368. A calling party responsive to the voice message may input a predetermined ID code, for example, consisting of a 4 digit number or speak a predetermined password, for example a person's name, if the calling party knows it. After the transmission of the voice message, the received signals continue to be applied to voice recognition/response circuit 350 by way of demodulator 312 and audio circuit 337. In voice recognition/response circuit 350, the received signal is input to voice recognition LSI 357 via high-pass filter 352, amplifier 353, and attenuator 356 and is also input to DTMF receiver 368 via filter 367.

If the time measured by the internal timer of CPU 331 has expired (step 115) without detecting the ID code or the password from the calling party, the operation of CPU 331 is interrupted by the internal timer and CPU 331 returns to the reception standby state (step 1104 FIG. 8). Then CPU 331 sends a second connection signal to audio circuit controller 339. Responsive to the second connection signal, audio circuit controller 339 controls switching section 337a in audio circuit 337 so that demodulator 312 and modulator 314 are re-connected to control signal processor 338.

On the other hand, if DTMF signals indicative of the ID code are detected in DTMF receiver 368 or the password voice message is recognized in voice recognition LSI 357 (step 116), in response to the detection signal from DTMF receiver 368 or voice recognition/response circuit 350, CPU 331 receives a data code corresponding to a recognized password or a detected ID code and checks whether it is a call to be indicated to the user of or not by comparing the data code with the stored data code which is read from RAM 335. If it is determined that the reception of the incoming call is to be indicated, CPU 331 sends a third control signal to audio circuit controller 339. Responsive to the third control signal, audio circuit controller 339 controls switching section 337b in audio circuit 337 so that a pulse signal of a predetermined frequency for generating a ringer tone from oscillator/frequency divider 332 is applied to speaker 492 via line 1003. Accordingly, a ringer tone is sounded at speaker 492 (step 117). Then the operation of the apparatus proceeds to a step of waiting for the user's response (step 1109; FIG. 8).

When the user responds to the ringing tone by depressing the "SEND" key, handset controller 418 detects the key operation and sends a control signal of "SEND" key operation to CPU 331 via digital interface 340 by way of lines 1002. Also in the event that the user takes handset 400b off-hook, the information of the closed state of hook switch 472 is transmitted to CPU 331 via digital interface 340 by way of line 1001. Responsive to the off-hook control signal or the information, CPU 331 sends a fourth connection signal to audio circuit controller 339. Receiving the fourth connection signal, audio circuit controller 339 controls switching sections 337a and 337b in audio circuit 337 so that demodulator 312 and modulator 314 are connected to audio input/output unit 490 by way of line 1003 (connection C in FIG. 10). Accordingly the user may communicate with the calling party by using hands-free microphone 494 and loudspeaker 492 or handset microphone 466 and handset receiver 498. When fading occurs for a predetermined period of time or longer in the speech channel reception mode (step 1106), the acknowledge signal sending state (step 1104) or a communication enable state (step 1110), the transmission function is disabled (step 1108). When the transmission function is disabled (step 1108), initialization is resumed (step 1102).

While a ringer tone is sounded when the DTMF signal indicates an ID code or the password voice message is detected in the above-described embodiment, there are various modifications of indicating means. Instead of a ringer tone, it may be a beep tone beeping for a short time, for example, one second. Otherwise some message may be displayed with or without sounding a tone. To avoid sounding a tone, necessary to maintain the sounder silent. In this case, CPU 339 sends a display signal to handset controller 418. Responsive to the display signal, handset controller 418 controls display unit so that a predetermined message, for example, "A CALL IS RECEIVED" is displayed. Or in the case that the DTMF signal indicative of an ID code is detected, CPU 331 sends the detected ID code, which matched the stored one, with the display signal to handset controller 418. Responsive to the display signal, handset controller 418 controls display unit 450 so that numerical or alphabetical characters corresponding to the detected ID code are displayed. According to this modification, the user may identify who is a caller by checking the displayed characters. Furthermore, on the basis of the recognized password, one or more voices corresponding to the password may be generated. In this case, CPU 331 sends the data code corresponding to the recognized password, which also matched with a stored one, to voice response circuit 350d, voice recognition/response circuit 350 via data bus 343 after sending a chip select signal for selecting speech storage/reproduction LSI 710 with the RD signal via control bus 345 CPU 331 then sends a fifth connection signal to audio circuit controller 339. Receiving the fifth connection signal, audio circuit controller 339 controls switching section 337a in audio circuit 337 so that the output of voice recognition/response circuit 350 is connected with line 1003 to speaker 492 (connection D in FIG. 10). Responsive to the control signals from CPU 331, voice response circuit 350d outputs an analogue voice signal, which has been stored in advance by the user. The signal is transmitted to speaker 492 by way of line 1003. Accordingly, a voice corresponding to a password spoken by a caller is generated from speaker 492. It should be noted that voice storage in RAM 708 in advance may be accomplished by the user of the apparatus or any person who knows the password. After generating the voice, a line connection in switching section 337a of audio circuit 337 is switched to connection C from connection D.

Instead of accomplishing the present invention in a separate embodiment from the automobile, the present invention may be integrated into the automobile. For example, voice synthesis means for generating sent belt warning messages may be applied for messages of the mobile telephone apparatus. The visual display 450 may be integrated into the dashboard and so on.

Although an embodiment applied to a mobile telephone apparatus has been described, it is apparent to those skilled in this art that this invention may be easily applied to any transportable type of radio telephone or handheld type radio telephone. In the case of a transportable type radio telephone, radio unit 300 and antenna 200 are incorporated into a casing of main unit 400a of telephone unit 400, and thereby the telephone unit including radio unit and antenna is capable of being carried by a user. In the case of a handheld type radio telephone, telephone unit 400, radio unit 300, and antenna 200 are combined together in a single casing. The essential features of this invention are applicable to all such cases. Further more, the scope of this invention is not limited to the application in a radio telephone capable of being connected to a land-line telephone such as a cellular radio telephone in a cellular radio system but any application of a radio telephone using radio channels falls within the scope of this invention.

We claim:

1. Radio telephone apparatus comprising:
   receiving means for receiving signals broadcast through one or more radio channels;
   first detecting means responsive to said receiving means for detecting a first predetermined signal sequence indicative of an incoming call to the radio telephone apparatus;
   second detecting means for detecting a second predetermined signal sequence originated in a calling apparatus and transmitted in association with said first predetermined signal sequence; and
   indicating means, responsive to the detection of both of said first predetermined signal sequence and said second predetermined signal sequence, for indicating reception of a call.

2. The apparatus of claim 1 wherein said receiving means comprises means for detecting an availability of one or more radio channels.

3. The apparatus of claim 2 wherein said receiving means further comprises means for establishing one or more radio channels in response to the detection of availability of the channels.

4. The apparatus of claim 1 wherein said first detecting means comprises signal detecting means for detecting an incoming signal with an address signal addressing the radio telephone apparatus.

5. The apparatus of claim 4 wherein said signal detecting means comprises memory means for storing one or more identification numbers of the radio telephone apparatus and comparing means for comparing said identification number with said address signal.

6. The apparatus of claim 1 further comprising third detecting means for detecting a channel designation signal received in association with said incoming signals and establishing means responsive to said channel designation signal for establishing one or more communication links to communicate with said calling apparatus.

7. The apparatus of claim 6 wherein said second detecting means for detecting said second predetermined signal sequence transmitted via said established communication links.

8. The apparatus of claim 6 further comprising reestablishing means for reestablishing one or more communication links to communicate with said base station when said second detecting means does not detect said second predetermined sequence within a predetermined time period.

9. The apparatus of claim 1 wherein said second detecting means comprises signal decoding means for decoding dual tone multifrequency signals and providing address identification data.

10. The apparatus of claim 9 wherein said signal decoding means comprises a plurality of filters for analyzing frequency components of the received signals.

11. The apparatus of claim 9 wherein said second detecting means further comprises memory means for storing one or more identification data, comparing means for comparing decoded address identification data with identification data stored in said memory means, and generating means for generating detection signal when the decoded address identification data is identical to one of said stored identification data.

12. The apparatus of claim 1 wherein said second detecting means comprises voice recognizing means for recognizing voice signals.

13. The apparatus of claim 12 wherein said voice recognizing means comprises storing means for storing one or more voice patterns and comparing means for comparing the received signals with said voice patterns.

14. The apparatus of claim 12 wherein said second detecting means further comprises signal decoding means for decoding dual tone multifrequency signals and generating a detection signal when either of said voice recognition means or signal decoding means detects said second predetermined signal sequence and said indicating means indicates reception of a call in response to said detection signal.

15. The apparatus of claim 1 wherein said indicating means comprises display means.

16. The apparatus of claim 15 wherein said display means comprises one or more lights indicative of an incoming call.

17. The apparatus of claim 15 wherein display means comprises a character display unit for displaying one or more characters indicative of an incoming call.

18. The apparatus of claim 15 wherein the display means displays characters corresponding to said second predetermined signal sequence.

19. The apparatus of claim 1 wherein said indicating means comprises sounding means for generating a beep tone.

20. The apparatus of claim 1 wherein said indicating means comprises voice synthesis means for artificially synthesizing one or more messages indicative of an incoming call.

21. The apparatus of claim 20 wherein said voice synthesis means synthesizes a voice message corresponding to said second predetermined signal sequence.

22. The apparatus of claim 1 wherein said indicating means comprises means for indicating information corresponding to said second predetermined sequence.

23. The apparatus of claim 1 further comprises mode setting means for setting a selective reception made and wherein said indicating means indicates reception of a call responsive to the detection of both of said first predetermined signal sequence and said second predetermined signal sequence when the selective reception mode is set by said mode setting means and indicates reception of a call responsive to only the detection of said first predetermined signal sequence when the selective reception mode is not set by said mode setting means.

24. Radio telephone apparatus comprising:
receiving means for receiving signals over one or more radio channels;
first detecting means, responsive to the receiving means, for detecting a signal sequence indicative of an incoming call to the radio telephone apparatus;
establishing means for establishing one or more communication links with an apparatus calling the radio telephone apparatus in response to the detection of said signal sequence;
second detecting means for detecting one or more password signals originated at a calling apparatus and transmitted via said communication link; and
output means for outputting one or more signals indicative of an incoming call in response to the detection of said password signals.

25. Radio telephone apparatus comprising:
receiving means for receiving signals over one or more radio channels;
first establishing means for establishing a first communication link with a base station in response to first channel establishment information included in the signals received by said receiving means;
first detecting means for detecting a signal sequence, indicative of an incoming call to the radio telephone apparatus, in the signals received through said first communication link;
second establishing means for establishing a second communication link with an apparatus calling the radio telephone apparatus on the basis of second channel establishment information included in the signals received by said receiving means instead of releasing said first communication link in response to the detection of said signal sequence;
second detecting means for detecting one or more password signals received through said second communication link; and
indicating means for indicating reception of a call in response to the detection of said password signals.

26. The apparatus of claim 25 further comprising transmitting means for transmitting a response signal through said second communication link in response to the establishment of said second communication link.

27. The apparatus of claim 26 further comprises reestablishing means for reestablishing said first communication link instead of releasing said second communication link in response to the failure to detect said password signal within a predetermined time period from the transmission of said response signal.

28. Radio telephone apparatus comprising:
receiver means for receiving signals broadcast over one or more radio channels;
detecting means, responsive to the receiver means, for detecting an incoming signal addressed to the radio telephone apparatus;
transmitter means for transmitting a response signal over a radio channel designated by a first channel designation signal included in the signals received by said receiver means in response to the reception of said incoming signal;
signal recognizing means for recognizing a predetermined signal sequence from the signals received within a predetermined time period from the transmission of said response signal by said receiving means over a channel designated by a second channel designation signal included in the signals received by said receiving means; and
indicating means for indicating reception of a call in response to the recognition of said predetermined signal sequence.

29. Radio telephone apparatus comprising:
receiving means for receiving signals broadcast through one or more radio channels;
first detecting means, responsive to the receiving means, for detecting a first predetermined signal sequence indicative of an incoming call to the radio telephone apparatus;
establishing means for establishing one or more communication links with an apparatus calling the radio telephone apparatus in response to the detection of said signal sequence;
answering means for answering said calling apparatus by way of one of said established communication links;
second detecting means for detecting a second predetermined signal sequence transmitted from said calling party over one of said established communication links; and
indicating means, responsive to the detection of said second predetermined signal sequence, for indicating an incoming call.

30. Method for receiving a call from a calling apparatus to a called radio telephone apparatus via a base station comprising the steps of:
transmitting an address signal indicative of said called radio telephone apparatus from said calling apparatus via said base station;
broadcasting the address signal in response to the reception of the address signal transmitted via said base station;
broadcasting a response signal in response to the reception of the broadcast calling signal with the address signal;
establishing a communication link between said calling apparatus and said called radio telephone apparatus in response to the reception of the broadcast response signal at said base station;
transmitting one or more password signals by way of said communication link from said calling apparatus; and
indicating an incoming call at said called radio telephone apparatus in response to the reception of the password signals transmitted by way of said first communication link at said called radio telephone apparatus.

* * * * *